(12) United States Patent
Palomares et al.

(10) Patent No.: US 12,201,044 B2
(45) Date of Patent: Jan. 21, 2025

(54) METHOD FOR AUTONOMOUSLY WEEDING CROPS IN AN AGRICULTURAL FIELD

(71) Applicant: FarmWise Labs, Inc., San Francisco, CA (US)

(72) Inventors: Thomas Palomares, San Francisco, CA (US); Sébastien Boyer, San Francisco, CA (US); Arthur Flajolet, San Francisco, CA (US); Eric Stahl-David, San Francisco, CA (US)

(73) Assignee: FarmWise Labs, Inc., Santa Clara, CA (US)

( * ) Notice: Subject to any disclaimer, the term of this patent is extended or adjusted under 35 U.S.C. 154(b) by 927 days.

(21) Appl. No.: 17/079,251

(22) Filed: Oct. 23, 2020

(65) Prior Publication Data

US 2021/0105995 A1    Apr. 15, 2021

Related U.S. Application Data

(63) Continuation-in-part of application No. 16/570,878, filed on Sep. 13, 2019, now Pat. No. 11,596,139, (Continued)

(51) Int. Cl.
*A01B 39/18* (2006.01)
*G05D 1/00* (2024.01)

(52) U.S. Cl.
CPC ........... *A01B 39/18* (2013.01); *G05D 1/0246* (2013.01)

(58) Field of Classification Search
None
See application file for complete search history.

(56) References Cited

U.S. PATENT DOCUMENTS

| 4,182,101 A | 1/1980 | Gaeddert et al. |
| 4,674,403 A | 6/1987 | Bryant et al. |

(Continued)

FOREIGN PATENT DOCUMENTS

| AU | 2013295763 B2 | 10/2017 |
| AU | 2018216246 B2 | 8/2022 |

(Continued)

OTHER PUBLICATIONS

Notice of Allowance from U.S. Appl. No. 16/570,878 dated Oct. 24, 2022, 8 pages.

(Continued)

*Primary Examiner* — Lail A Kleinman
(74) *Attorney, Agent, or Firm* — Jeffrey Schox; Diana Lin

(57) ABSTRACT

One variation of a method for executing agricultural actions on an agricultural field includes: based a type of a crop planted on the agricultural field and a maturity of the crop, setting a nominal blade gap width of a weeding module installed in an autonomous agricultural vehicle; and, at the autonomous agricultural vehicle, while autonomously traversing the agricultural field, detecting a first target plant passing under the autonomous agricultural vehicle and aligned with the weeding module, triggering the weeding module to open a set of weeding blades to the nominal blade gap width at a nominal blade speed in response to the first target plant approaching the weeding module, and triggering the weeding module to close the set of weeding blades in response to the first target plant passing the weeding module.

18 Claims, 2 Drawing Sheets

Related U.S. Application Data which is a continuation of application No. 16/267,362, filed on Feb. 4, 2019, now Pat. No. 10,455,826.

(60) Provisional application No. 62/925,186, filed on Oct. 23, 2019, provisional application No. 62/626,602, filed on Feb. 5, 2018.

(56) References Cited

U.S. PATENT DOCUMENTS

| | | |
|---|---|---|
| 4,721,168 A | 1/1988 | Kinzenbaw |
| 4,868,752 A | 9/1989 | Fujii et al. |
| 5,272,859 A | 12/1993 | Pruitt et al. |
| D360,862 S | 8/1995 | McClain et al. |
| 5,540,288 A | 7/1996 | Dietrich, Sr. |
| 5,625,776 A | 4/1997 | Johnson |
| 5,842,428 A | 12/1998 | Stufflebeam et al. |
| 5,884,464 A | 3/1999 | McMillen |
| 5,924,269 A | 7/1999 | McMillen |
| 6,109,193 A | 8/2000 | Crabb et al. |
| 6,442,485 B2 | 8/2002 | Evans |
| 6,523,333 B2 | 2/2003 | Metzger |
| 6,819,780 B2 | 11/2004 | Benson et al. |
| 7,272,713 B1 | 9/2007 | Tester |
| 7,606,739 B1 | 10/2009 | Johnson |
| 8,191,795 B2 | 6/2012 | Grimm et al. |
| 8,523,085 B2 | 9/2013 | Grimm et al. |
| 8,540,159 B2 | 9/2013 | Lee et al. |
| 8,606,503 B2 | 12/2013 | Rothschild |
| 9,030,549 B2 | 5/2015 | Redden |
| 9,064,173 B2 | 6/2015 | Redden |
| 9,119,388 B2 | 9/2015 | Jens |
| 9,144,189 B2 | 9/2015 | Stoller et al. |
| 9,288,937 B2 | 3/2016 | Sauder et al. |
| 9,288,938 B2 | 3/2016 | Cavender-Bares et al. |
| 9,332,689 B2 | 5/2016 | Baurer et al. |
| 9,339,023 B2 | 5/2016 | Ballu |
| 9,392,743 B2 | 7/2016 | Camacho-Cook et al. |
| 9,420,748 B2 | 8/2016 | Chan et al. |
| 9,578,799 B2 | 2/2017 | Allgaier et al. |
| 9,658,201 B2 | 5/2017 | Redden et al. |
| 9,717,171 B2 | 8/2017 | Redden et al. |
| 9,750,174 B2 | 9/2017 | Sauder et al. |
| 9,756,771 B2 | 9/2017 | Redden |
| 9,801,322 B2 | 10/2017 | Sauder et al. |
| 9,943,027 B2 | 4/2018 | Sauder et al. |
| 10,008,035 B1 | 6/2018 | Redden et al. |
| 10,098,273 B2 | 10/2018 | Redden et al. |
| 10,175,362 B2 | 1/2019 | Redden et al. |
| 10,219,431 B2 | 3/2019 | Stoller et al. |
| 10,219,449 B2 | 3/2019 | Redden |
| 10,255,670 B1 | 4/2019 | Wu et al. |
| 10,262,413 B2 | 4/2019 | Strnad et al. |
| 10,278,333 B2 | 5/2019 | Shen et al. |
| 10,327,393 B2 | 6/2019 | Redden et al. |
| 10,390,481 B1 | 8/2019 | Brown et al. |
| 10,390,497 B2 | 8/2019 | Redden |
| 10,448,571 B1 | 10/2019 | McFarland et al. |
| 10,491,879 B2 | 11/2019 | Redden |
| 10,524,402 B2 | 1/2020 | Redden |
| 10,537,071 B2 | 1/2020 | Redden |
| 10,548,306 B2 | 2/2020 | Albert et al. |
| 10,617,071 B2 | 4/2020 | Redden et al. |
| 10,624,269 B1 | 4/2020 | Linde |
| 10,679,056 B2 | 6/2020 | Zemenchik |
| 10,681,861 B2 | 6/2020 | Morgan et al. |
| 10,681,862 B2 | 6/2020 | Stoller et al. |
| 10,681,871 B1 | 6/2020 | Fay |
| 10,681,905 B2 | 6/2020 | Tanner et al. |
| 10,703,277 B1 | 7/2020 | Schroeder |
| 10,713,484 B2 | 7/2020 | Polzounov et al. |
| 10,719,709 B2 | 7/2020 | Zemenchik |
| 10,761,211 B2 | 9/2020 | Redden et al. |
| 10,769,845 B2 | 9/2020 | Redden |
| 10,785,905 B2 | 9/2020 | Stoller et al. |
| 10,806,074 B2 | 10/2020 | Zemenchik |
| 10,812,776 B2 | 10/2020 | Redden |
| 10,814,887 B1 | 10/2020 | Sutton |
| 10,845,810 B2 | 11/2020 | Flajolet et al. |
| D921,056 S | 6/2021 | Vallat |
| 11,030,804 B2 | 6/2021 | Redden et al. |
| 11,058,042 B2 | 7/2021 | Redden |
| 11,071,293 B2 | 7/2021 | Brown et al. |
| 11,071,991 B2 | 7/2021 | Serrat et al. |
| 11,085,156 B2 | 8/2021 | Serrat et al. |
| 11,093,745 B2 | 8/2021 | Redden et al. |
| 11,109,585 B2 | 9/2021 | Serrat et al. |
| 11,125,568 B2 | 9/2021 | Opitsch et al. |
| 11,129,343 B2 | 9/2021 | Redden et al. |
| 11,160,269 B2 | 11/2021 | Brown et al. |
| 11,178,809 B1 | 11/2021 | Brown et al. |
| 11,197,409 B2 | 12/2021 | Redden et al. |
| 11,237,563 B2 | 2/2022 | Javault et al. |
| 11,350,622 B2 | 6/2022 | Redden |
| 11,393,049 B2 | 7/2022 | Khait et al. |
| 11,553,636 B1 | 1/2023 | Palomares et al. |
| 11,919,636 B2 * | 3/2024 | Clark .................. G05D 1/224 |
| 2006/0213167 A1 | 9/2006 | Koselka et al. |
| 2014/0021267 A1 | 1/2014 | Sudduth et al. |
| 2014/0168412 A1 | 6/2014 | Shulman et al. |
| 2014/0180549 A1 | 6/2014 | Siemens et al. |
| 2014/0360811 A1 | 12/2014 | Ross et al. |
| 2015/0027044 A1 | 1/2015 | Redden |
| 2016/0150729 A1 | 6/2016 | Moore |
| 2016/0224703 A1 | 8/2016 | Shriver |
| 2017/0034986 A1 | 2/2017 | Koch et al. |
| 2017/0161560 A1 | 6/2017 | Itzhaky et al. |
| 2017/0219711 A1 | 8/2017 | Redden et al. |
| 2017/0290260 A1 | 10/2017 | Redden et al. |
| 2017/0359943 A1 | 12/2017 | Calleija et al. |
| 2018/0153084 A1 | 6/2018 | Calleija et al. |
| 2018/0242517 A1 | 8/2018 | Davis et al. |
| 2018/0243772 A1 | 8/2018 | Davis et al. |
| 2018/0295783 A1 | 10/2018 | Alexander et al. |
| 2018/0325019 A1 | 11/2018 | Connell et al. |
| 2018/0330166 A1 | 11/2018 | Redden et al. |
| 2019/0032305 A1 | 1/2019 | Hageman et al. |
| 2019/0050948 A1 | 2/2019 | Perry et al. |
| 2019/0064363 A1 | 2/2019 | Redden et al. |
| 2019/0104722 A1 | 4/2019 | Slaughter et al. |
| 2019/0110394 A1 | 4/2019 | Vannahmen |
| 2019/0150357 A1 | 5/2019 | Wu et al. |
| 2019/0239502 A1 | 8/2019 | Palomares et al. |
| 2019/0289767 A1 | 9/2019 | Gulotta |
| 2020/0011019 A1 | 1/2020 | Serrat et al. |
| 2020/0019777 A1 | 1/2020 | Gurzoni et al. |
| 2020/0045953 A1 | 2/2020 | Serrat et al. |
| 2020/0057443 A1 * | 2/2020 | Silver .................. G05D 1/0088 |
| 2020/0068783 A1 | 3/2020 | Strnad et al. |
| 2020/0107490 A1 | 4/2020 | Zemenchik |
| 2020/0196535 A1 | 6/2020 | Dagondon et al. |
| 2020/0214203 A1 | 7/2020 | Young et al. |
| 2020/0214215 A1 | 7/2020 | Kemmerer et al. |
| 2020/0221624 A1 | 7/2020 | Turner et al. |
| 2020/0221628 A1 | 7/2020 | Blunier et al. |
| 2020/0221630 A1 | 7/2020 | Pomedli |
| 2020/0221638 A1 | 7/2020 | Engel et al. |
| 2020/0221651 A1 | 7/2020 | Klingler et al. |
| 2020/0221681 A1 | 7/2020 | Schwaderer et al. |
| 2020/0230633 A1 | 7/2020 | Serrat et al. |
| 2020/0236838 A1 | 7/2020 | Smith |
| 2020/0236841 A1 | 7/2020 | Thompson |
| 2020/0242754 A1 | 7/2020 | Peters |
| 2020/0249217 A1 | 8/2020 | Stanhope et al. |
| 2020/0282969 A1 | 9/2020 | Manji |
| 2020/0296875 A1 | 9/2020 | Calleija et al. |
| 2020/0296885 A1 | 9/2020 | Stoller et al. |
| 2020/0302170 A1 | 9/2020 | Polzounov et al. |
| 2020/0340203 A1 | 10/2020 | Torii |
| 2020/0352086 A1 | 11/2020 | Stoller et al. |
| 2020/0352098 A1 | 11/2020 | Fujii et al. |
| 2020/0355829 A1 | 11/2020 | Redden et al. |
| 2020/0359565 A1 | 11/2020 | Yamada et al. |
| 2020/0367430 A1 | 11/2020 | Ito et al. |

(56) References Cited

U.S. PATENT DOCUMENTS

| | | |
|---|---|---|
| 2020/0367431 A1 | 11/2020 | Ito et al. |
| 2020/0375094 A1 | 12/2020 | Calleija et al. |
| 2020/0383268 A1 | 12/2020 | Fujii et al. |
| 2021/0000006 A1 | 1/2021 | Ellaboudy et al. |
| 2021/0022282 A1* | 1/2021 | Wallach ............... A01B 63/004 |
| 2021/0031624 A1 | 2/2021 | Ishikawa et al. |
| 2021/0034057 A1 | 2/2021 | Flajolet et al. |
| 2021/0037695 A1 | 2/2021 | Strnad et al. |
| 2021/0051839 A1 | 2/2021 | Strnad et al. |
| 2021/0058603 A1 | 2/2021 | Redden |
| 2021/0080972 A1 | 3/2021 | Iwami et al. |
| 2021/0105995 A1 | 4/2021 | Palomares et al. |
| 2021/0137015 A1 | 5/2021 | Ibuki et al. |
| 2021/0149406 A1 | 5/2021 | Javault et al. |
| 2021/0161059 A1 | 6/2021 | Kaufmann |
| 2021/0192180 A1* | 6/2021 | Wang ................. G06V 20/698 |
| 2021/0243933 A1 | 8/2021 | Antle et al. |
| 2021/0243937 A1 | 8/2021 | Antle et al. |
| 2021/0243940 A1 | 8/2021 | Snyder et al. |
| 2021/0248690 A1 | 8/2021 | Colgan et al. |
| 2021/0250526 A1 | 8/2021 | Germain |
| 2021/0307227 A1 | 10/2021 | Redden |
| 2021/0325346 A1 | 10/2021 | Khait et al. |
| 2021/0327133 A1 | 10/2021 | Redden et al. |
| 2021/0378187 A1 | 12/2021 | Redden et al. |
| 2021/0406540 A1 | 12/2021 | Redden et al. |
| 2022/0007631 A1 | 1/2022 | Brown et al. |
| 2022/0022360 A1 | 1/2022 | Redden |
| 2022/0053689 A1 | 2/2022 | Brown et al. |
| 2022/0071192 A1 | 3/2022 | Benoit-Levy et al. |
| 2022/0076065 A1 | 3/2022 | Benoit-Levy et al. |
| 2022/0087094 A1 | 3/2022 | Redden et al. |
| 2022/0092705 A1 | 3/2022 | Khait et al. |
| 2022/0142142 A1 | 5/2022 | Van Alphen |
| 2022/0148100 A1 | 5/2022 | Khait et al. |
| 2022/0172466 A1 | 6/2022 | Snyder et al. |
| 2022/0174933 A1 | 6/2022 | Smith |
| 2022/0174934 A1 | 6/2022 | Germain |
| 2022/0256832 A1 | 8/2022 | Serrat et al. |
| 2022/0327183 A1* | 10/2022 | Russo ..................... G06F 30/20 |
| 2022/0394912 A1 | 12/2022 | Barklund |
| 2023/0043631 A1 | 2/2023 | Sandbrook |
| 2023/0413798 A1 | 12/2023 | Sibley et al. |
| 2024/0032450 A1 | 2/2024 | Herlitzius et al. |

FOREIGN PATENT DOCUMENTS

| | | |
|---|---|---|
| BR | 112019016157 A2 | 3/2020 |
| BR | 112019016644 A2 | 3/2020 |
| BR | 112019016111 A2 | 4/2020 |
| BR | 112022000718 A2 | 3/2022 |
| CA | 3050364 A1 | 8/2018 |
| CA | 3052114 A1 | 8/2018 |
| CA | 3054649 A1 | 8/2018 |
| CA | 3147000 A1 | 1/2021 |
| CA | 3146705 A1 | 3/2021 |
| CN | 106912331 A | 7/2017 |
| CN | 107846848 A | 3/2018 |
| CN | 110520896 A | 11/2019 |
| CN | 113597874 A | 11/2021 |
| DE | 102017204650 A1 | 9/2018 |
| DE | 102019218177 A1 | 5/2021 |
| DE | 102019218182 A1 | 5/2021 |
| DE | 102019218186 A1 | 5/2021 |
| DE | 102019218187 A1 | 5/2021 |
| DE | 102019218188 A1 | 5/2021 |
| DE | 102019218192 A1 | 5/2021 |
| DK | 3316673 T3 | 12/2020 |
| EP | 3355675 A1 | 8/2018 |
| EP | 3357332 A1 | 8/2018 |
| EP | 3358525 A1 | 8/2018 |
| EP | 3323300 B1 | 6/2019 |
| EP | 3576526 A1 | 12/2019 |
| EP | 3577628 A1 | 12/2019 |
| EP | 3585168 A1 | 1/2020 |
| EP | 3666622 A1 | 6/2020 |
| EP | 3667555 A1 | 6/2020 |
| EP | 3682201 A1 | 7/2020 |
| EP | 3358525 B1 | 9/2020 |
| EP | 3316673 B1 | 11/2020 |
| EP | 3585168 B1 | 3/2021 |
| EP | 3830662 A1 | 6/2021 |
| EP | 3922099 A1 | 12/2021 |
| EP | 3937628 A1 | 1/2022 |
| EP | 3998843 A1 | 5/2022 |
| EP | 4021655 A1 | 7/2022 |
| EP | 4040953 A1 | 8/2022 |
| ES | 2846786 T3 | 7/2021 |
| FR | 3058616 A1 | 5/2018 |
| FR | 3063206 A1 | 8/2018 |
| FR | 3058616 B1 | 12/2018 |
| FR | 3071124 A1 | 3/2019 |
| FR | 3071124 B1 | 9/2019 |
| FR | 3093613 A1 | 9/2020 |
| FR | 3093614 A1 | 9/2020 |
| FR | 3098684 A1 | 1/2021 |
| FR | 3098962 A1 | 1/2021 |
| FR | 3063206 B1 | 8/2021 |
| FR | 3100140 B1 | 9/2021 |
| FR | 3110743 A1 | 11/2021 |
| FR | 3098962 B1 | 12/2021 |
| FR | 3110743 B1 | 4/2022 |
| GB | 2096874 A | 10/1982 |
| JP | 2013059296 A | 4/2013 |
| JP | 2020510771 A | 4/2020 |
| JP | 6737535 B2 | 7/2020 |
| JP | 2021136919 A | 9/2021 |
| JP | 7110236 B2 | 7/2022 |
| KR | 20190126060 A | 11/2019 |
| MX | 2019009306 A | 12/2019 |
| WO | 2018141995 A1 | 8/2018 |
| WO | 2018142371 A1 | 8/2018 |
| WO | 2018154490 A1 | 8/2018 |
| WO | 2019053364 A1 | 3/2019 |
| WO | 2020039434 A1 | 2/2020 |
| WO | 2020120802 A1 | 6/2020 |
| WO | 2020120804 A1 | 6/2020 |
| WO | 2020182840 A1 | 9/2020 |
| WO | 2021009710 A1 | 1/2021 |
| WO | 2021037417 A1 | 3/2021 |
| WO | 2021055485 A1 | 3/2021 |
| WO | 2021069980 A1 | 4/2021 |
| WO | 2021090294 A1 | 5/2021 |
| WO | 2021105006 A1 | 6/2021 |
| WO | 2021105014 A1 | 6/2021 |
| WO | 2021105015 A1 | 6/2021 |
| WO | 2021105017 A1 | 6/2021 |
| WO | 2021144785 A1 | 7/2021 |
| WO | 2021159123 A1 | 8/2021 |
| WO | 2021159124 A1 | 8/2021 |
| WO | 2021159125 A1 | 8/2021 |
| WO | 2021234063 A1 | 11/2021 |
| WO | 2022064482 A1 | 3/2022 |
| WO | 2022137217 A1 | 6/2022 |
| WO | 2022172274 A1 | 8/2022 |

OTHER PUBLICATIONS

"Precision Farming", Novalto, Oct. 13, 2001.
Kremesec, Garrick, et al., "Automated Agriculture Implement", U.S. Appl. No. 18/435,924, filed Feb. 7, 2024.
Kremesec, Garrick, et al., "Crop Detection System and/or Method", U.S. Appl. No. 18/435,730, filed Feb. 7, 2024.

* cited by examiner

METHOD FOR AUTONOMOUSLY WEEDING CROPS IN AN AGRICULTURAL FIELD

CROSS-REFERENCE TO RELATED APPLICATIONS

This application claims the benefit of U.S. Provisional Application No. 62/925,186, filed on 23 Oct. 2019, which is incorporated in its entirety by this reference.

This application is a continuation-in-part application of U.S. patent application Ser. No. 16/570,878, filed on 13 Sep. 2019, which is a continuation application of U.S. patent application Ser. No. 16/267,362, filed on 4 Feb. 2019, which claims the benefit of U.S. Provisional Application No. 62/626,602, filed on 5 Feb. 2018, each of which is incorporated in its entirety by this reference.

TECHNICAL FIELD

This invention relates generally to the field of agricultural implements and more specifically to a new and useful method for autonomously weeding crops in an agricultural field in the field of agricultural implements.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
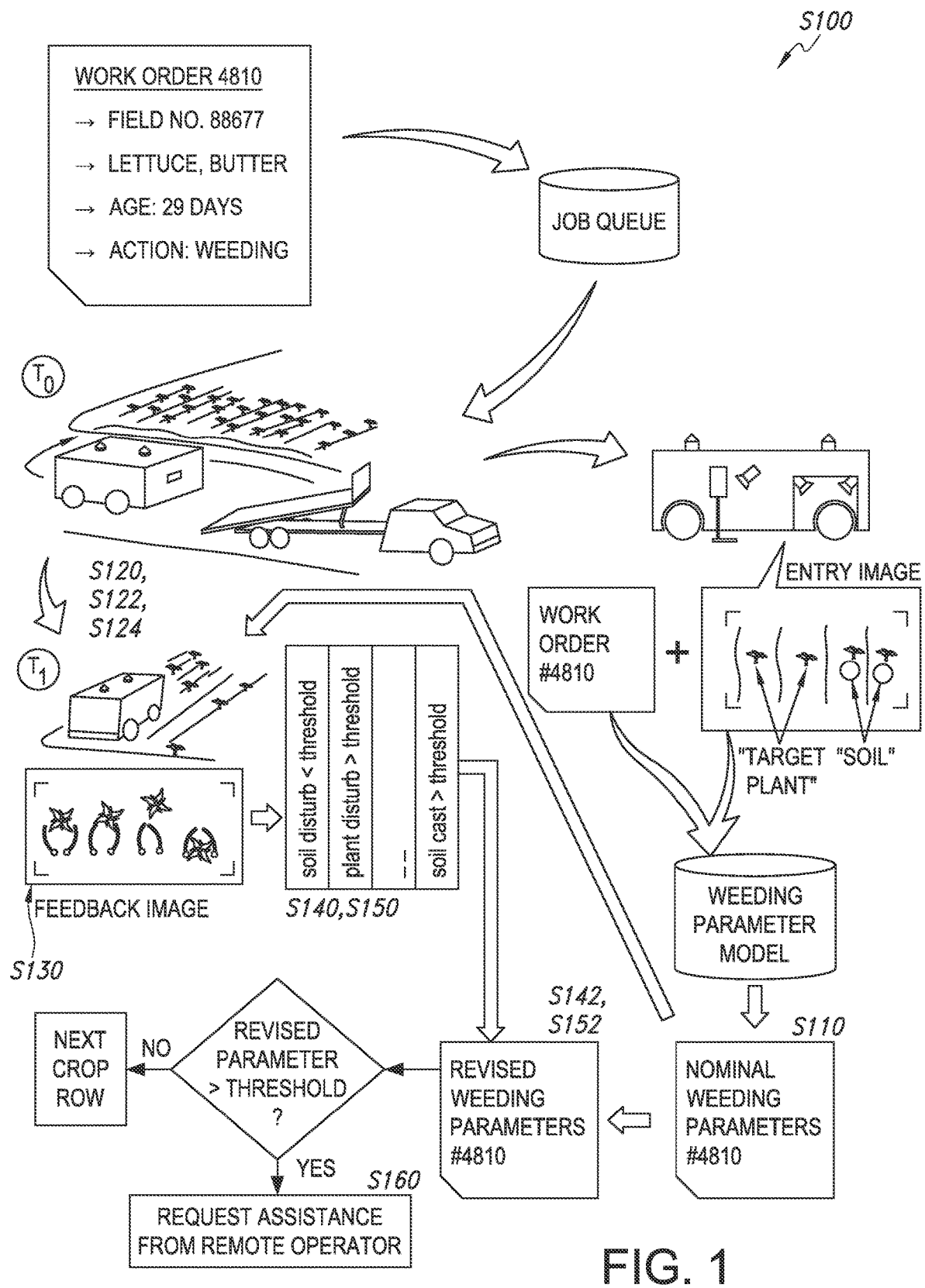
FIG. 1 is a flowchart representation of a method.

As shown in FIG. 1, a method S100 for executing agricultural actions on an agricultural field includes, based a type of a crop planted on the agricultural field and a maturity of the crop, setting a nominal blade gap width of a weeding module installed in an autonomous agricultural vehicle in Block S110. The method S100 also includes, at the autonomous agricultural vehicle, while autonomously traversing the agricultural field: detecting a first target plant passing under the autonomous agricultural vehicle and aligned with the weeding module in Block S120; in response to the first target plant approaching the weeding module, triggering the weeding module to open a set of weeding blades to the nominal blade gap width at a nominal blade speed in Block S122; in response to the first target plant passing the weeding module, triggering the weeding module to close the set of weeding blades in Block S124; recording a sequence of feedback images over a period of time spanning opening of the weeding module and closure of the weeding module in Block S130; based on the sequence of feedback images, characterizing motion of the first target plant in Block S140; calculating a revised blade gap width by modifying the nominal blade gap width proportional to motion of the first target plant in Block S142; and, in response to the revised blade gap width deviating from the nominal blade gap width by more than a threshold gap difference, prompting verification by a remote human operator in Block S160.

One variation of the method S100 includes: setting the nominal blade speed for the weeding module in Block S112; at the autonomous agricultural vehicle, while autonomously traversing the agricultural field, based on the sequence of feedback images, characterizing deposition of soil onto the first target plant in Block S150; calculating a revised blade speed by modifying the nominal blade speed inversely proportional to deposition of soil onto the first target plant in Block S152; and, in response to the revised blade speed deviating from the nominal blade speed by more than a threshold speed difference, prompting verification by the remote human operator in Block S160.

2. Applications

Generally, the method S100 can be executed by and/or in conjunction with an autonomous agricultural vehicle (hereinafter the "autonomous vehicle"): to set nominal parameters for executing an agricultural action (e.g., seeding, weeding, watering, applying fertilizer, applying pesticide, harvesting) via a set of tool modules loaded into the autonomous vehicle in preparation for deploying the autonomous vehicle to an agricultural field; to automatically adjust these nominal parameters in (near) real-time based on results of recent agricultural actions completed by the autonomous vehicle while autonomously traversing the agricultural field; and to selectively request guidance or verification from a remote human operator while autonomously traversing the agricultural field, such as when adjustments to these agricultural action parameters deviate substantively from the nominal parameters set at the beginning of this operational period.

In particular, the autonomous vehicle, a field operator, and/or a remote operator can set initial agricultural action parameters for the autonomous vehicle in preparation for deploying the autonomous vehicle to an agricultural field based on characteristics of the agricultural field and/or characteristics of a crop planted thereon. For example, in preparation for weeding a lettuce crop, a set of weeding modules are loaded into the autonomous vehicle. In this example, each weeding module includes a pair of weeding blades configured to run below grade in a crop row, to open as the blades approach and move past a head of lettuce in the crop row, and to close between consecutive heads of lettuce in order to uproot any other plants (e.g., weeds) growing in the crop row. In this example, the autonomous vehicle, the field operator, and/or the remote operator can set a nominal blade gap width between tips of blades in a weeding module—based on a type and maturity of the lettuce in this agricultural field—such that these blades are expected to clear and not disrupt heads of lettuce in a crop row in this agricultural field when opened to this blade gap width. The autonomous vehicle, the field operator, and/or the remote operator can similarly set a nominal blade open distance in the weeding module—based on the type and maturity of the lettuce—such that these blades remain open to the nominal blade gap width for a sufficient distance on each side of a head of lettuce and thus do not disrupt this head of lettuce as the weeding module is drawn past this head of lettuce. The autonomous vehicle, the field operator, and/or the remote operator can also set a nominal blade depth (or nominal blade pressure) at which a weeding module sets is blades below grade (or depresses its blades into soil within a crop row) based on the type and maturity of the lettuce crop, a time since the agricultural field was last weeded, a looseness of soil in the agricultural field, and/or a dryness of soil in the agricultural field. Furthermore, the autonomous vehicle, the field operator, and/or the remote operator can also set a nominal blade speed (e.g., a peak speed of blades in a weeding module when opened and closed) based on a looseness and dryness of soil in the agricultural field.

Once deployed to the agricultural field, the autonomous vehicle can autonomously: align itself with a first set of crops rows on the agricultural field; navigate toward and over this first set of crop rows; detect a first column of target plants in this first set of crop rows; and selectively trigger weeding modules in the autonomous vehicle to open and close around these first target plants according to the nominal parameters thus defined for this weeding operation on the agricultural field. The autonomous vehicle can also: record a sequence of feedback images before, during, and after blades of a first weeding module are opened and closed around a first target plant; detect this first plant in this sequence of feedback images; scan this sequence of feedback images for other plants near the first target plant; characterize movement of the first target plant during this actuation of the first weeding module based on this sequence of feedback images; and/or detect soil cast onto this first target plant during this actuation of the first weeding module based on this sequence of feedback images; etc. Accordingly, the autonomous vehicle can: increase the blade gap width and the blade open distance (e.g., for the first weeding module specifically) responsive to detecting excessive motion of the first target plant; or decrease the blade gap width and the blade open distance responsive to detecting no motion of the first target plant or detecting an undisturbed weed near the base of the first target plant. The autonomous vehicle can also: decrease the blade depth (or pressure) responsive to detecting a wide disturbance in soil around the first target plant; or increase the blade depth responsive to detecting disturbance in soil around the first target plant. Additionally or alternatively, the autonomous vehicle can: decrease the blade operating speed (and ground speed of the autonomous vehicle) responsive to detecting a large amount of soil cast on the first target plant; or vice versa.

The autonomous vehicle can repeat this process for each weeding module as each weeding module traverses a head of lettuce in this agricultural field. However, if a parameter of a weeding module exceeds an absolute threshold value or deviates from a nominal value by more than a threshold deviation, the autonomous vehicle can transmit a request for assistance from a remote human operator (e.g., a "teleoperator"), such as to verify or correct this parameter or to schedule on-site maintenance.

The autonomous vehicle can similarly detect—in feedback images—terminal actions by weeding modules that uproot and unintentionally cull target plants and selectively transmit a request for assistance from a remote human operator accordingly, such as if the autonomous vehicle unintentionally culls two consecutive plants in one crop row or more than a threshold proportion (e.g., 0.1%) of plants in a processed region of the agricultural field.

The autonomous vehicle is described below as executing Blocks of the method S100 to adjust parameters of weeding modules and the autonomous vehicle while autonomously weeding an agricultural field. However, the autonomous vehicle can implement similar methods and techniques to adjust parameters of seeding, watering, fertilizing, and/or other modules and the autonomous vehicle while autonomously seeding, watering, fertilizing, or completing other operations on an agricultural field.

3. Autonomous Vehicle

Figure 2:
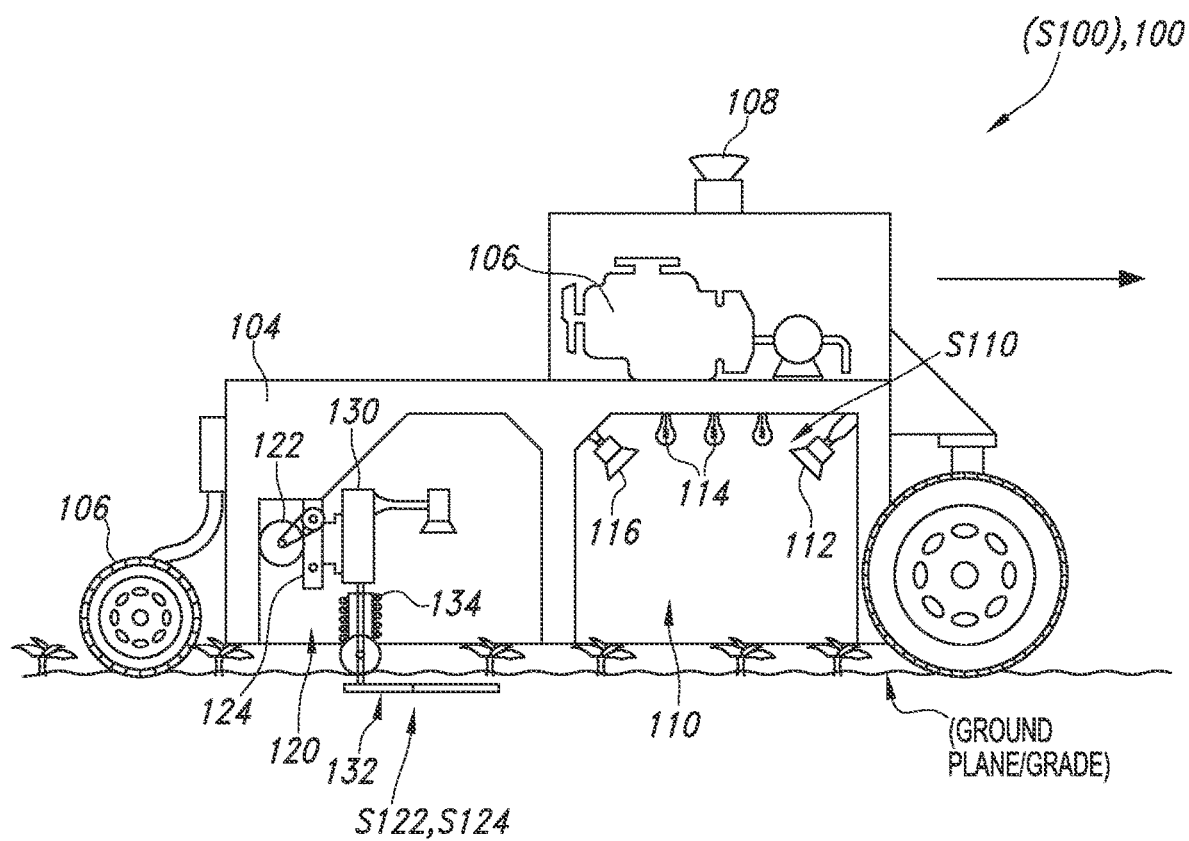
FIG. 2 is a schematic representation of an autonomous vehicle.

As shown in FIG. 2, the autonomous vehicle is configured to autonomously navigate through an agricultural field while detecting target plants in the agricultural field and executing agricultural actions (e.g., weeding, watering) on or around these target plants.

In one implementation, the autonomous vehicle defines a wheeled or tracked vehicle and includes a controller 102, a chassis 104, and a drive unit 106 configured to propel the autonomous vehicle forward. In this implementation, the controller 102 is configured to execute Blocks of the method S100 to adjust operational parameters and to selectively prompt a remote operator to control or verify operation of the autonomous vehicle. The autonomous vehicle can also include: geospatial position sensors 108 configured to detect the autonomous vehicle's location within a geospatial coordinate system; an inertial measurement unit configured to output values representing the autonomous vehicle's trajectory; outwardly facing color and/or depth sensors (e.g., color cameras, LIDAR sensors, and/or structured light cameras, etc.) configured to output images of the autonomous vehicle's environment; and a wireless communication module configured to broadcast video feeds from these cameras and requests for assistance to a remote operator portal and to receive feedback from a remote operator. The controller can thus implement computer vision and/or other artificial intelligence techniques to: detect nearby obstacles, localize itself within a scene, and/or contextualize a nearby scene based on objects detected in video feeds recorded by these cameras; elect next actions based on these objects and scenes; and adjust positions of various actuators within the autonomous vehicle accordingly during autonomous operation at an agricultural field.

3.1 Light Module

The autonomous vehicle can also include a light module 110 (e.g., arranged near a front end of the autonomous vehicle). The light module 110: can include a set of front cameras 112; can define an enclosed volume with a downward-facing opening spanning one or more crop rows traversed by the autonomous vehicle during operation on an agricultural field; and can block external light from reaching a ground area below, which may over-expose images recorded by the front facing cameras. For example, the light module 110 can include retractable or flexible shades (i.e. flaps) that substantially block external ambient light from illuminating the area enclosed within the light module 110. The light module 110 can also include controllable lighting elements 114 configured to repeatably illuminate a ground area directly under the opening of the light module 110.

3.2 Tool Housing

The autonomous vehicle can also include a tool housing 120 arranged behind the light module 110 and configured to house a set of tool modules. In one implementation, the tool housing 120 defines a downward-facing opening and forms a volume sufficiently large to enclose the set of tool modules while allowing for lateral adjustment of the tool modules, such as to reconfigure the autonomous vehicle for operation on different agricultural fields planted with different crop row configurations. In particular, a tool module loaded into the tool housing 120 can include an end effector that extends downward toward a ground area below the autonomous vehicle to execute agricultural operations on or near target plants below.

In one implementation, the tool housing 120 includes a toolbar extending laterally across the tool housing and configured to transiently receive a set of tool modules 130. For example, the toolbar can span a width of two meters, and a set of three, four, or five tool modules can be arranged on the toolbar based on crop row spacing at a particular field to which the autonomous vehicle is currently deployed. In this example, to autonomously weed a field around planted crops (i.e., "target plants"), a set of four weeding modules can be loaded onto the toolbar; as the autonomous machine passes over a field of crops, the controller can independently control each of these weeding modules to weed around target plants in four crop crop rows below.

At another time, to water these crops, a field technician may replace the weeding modules with watering modules connected to a water reservoir installed in the autonomous machine. As the autonomous machine navigates along rows of crops on an agricultural field, the autonomous machine can selectively and independently trigger spray valves in each of these watering modules 130 to open in order to selectively dispense water onto target plants in crop rows below.

Similarly, to fertilize these crops, the agricultural field technician may replace the watering modules 130 with fertilizing modules connected to a common fertilizer reservoir installed in the autonomous machine. As the autonomous machine navigates along rows of crops in an agricultural field, the autonomous machine can selectively and independently trigger valves in each of these fertilizing modules 130 to open in order to selectively dispense fertilizer onto target plants in crop rows below.

The autonomous machine can also include a set of toolbar actuators configured to raise and lower ends of the toolbar, thereby decreasing and increasing depths of tool modules installed on the toolbar, accordingly. Additionally or alternatively, the toolbar actuators can be configured to apply controllable amounts of pressure onto the ends of the toolbar, thereby adjusting pressures applied by installed tool modules (e.g., by wheels or rollers installed on bottoms ends of tool modules) onto crop rows below, and thus controlling tool depth and ground control for tool modules loaded onto the toolbar.

Additionally or alternatively, the autonomous vehicle can be loaded with tool modules 130 including integrated depth adjustment and/or integrated pressure adjustment actuators.

In another implementation, the tool housing includes a set of tool receptacles 124, each including a fixed or independently-actuatable toolbar configured to transiently receive a tool module. In this implementation, to prepare the autonomous vehicle to autonomously weed a field of crops, each tool receptacle 124 in the autonomous machine can be loaded with a weeding module. As the autonomous machine passes over a set of crop rows in an agricultural field, the autonomous vehicle can independently control these tool receptacles and corresponding weeding modules in order to maintain alignment between these weeding modules and corresponding crop rows below and to selectively weed around target plants in these crop rows.

3.3 Cameras

The autonomous vehicle can also include a set of cameras (or other optical sensors) arranged inside the light module 110 and inside the tool housing 120 and configured to record images of ground areas passing under the light module 110 and the tool housing 120 as the autonomous vehicle autonomously navigates along crop rows within an agricultural field.

3.3.1 Front Camera

In one implementation, the autonomous vehicle includes a front camera 112 (e.g., a high-resolution, high-speed RGB camera or multi-spectral imager) arranged in the light module 110, defining a field of view spanning all or a portion of the opening of the light module 110, and configured to record images (or "entry images") of ground areas entering the light module 110 from the front of the autonomous vehicle (i.e., ground areas that the autonomous vehicle is navigating over). The autonomous vehicle can then analyze these entry images to detect and distinguish "target plants" from weeds, to calculate positions of stalks of target plants with a relatively high degree of accuracy and repeatability, and/or to extract qualities of these target plants (e.g., plant age, plant size, pest presence, fertilizer burns, nutrient or water deficiency, etc.).

In one implementation, the autonomous vehicle includes multiple front cameras 112 arranged in the light module 110. For example, the autonomous vehicle can include one front camera 112 arranged over each crop row spanned by the light module 110, wherein each front camera 112 is configured to record images of a single crop row. In this example, the autonomous vehicle can process images from these front cameras 112 independently and control individual tool modules trailing these front cameras 112 accordingly. In another example, the autonomous vehicle includes two or more cameras arranged in the light module 110 and defining fields of view that span multiple (e.g., two or three) crop rows. The autonomous vehicle can then: process images output by these cameras independently; or stitch discrete, concurrent images recorded by these cameras into a composite image of the ground area spanned by the light module 110. The autonomous vehicle can then process these individual images or this composite image: to detect plants passing under the light module; to distinguish target plants from other plants (e.g., weeds); to estimate stalk positions (e.g., centroids leaf areas) of these target plants; to calculate lateral offsets between the trajectory of each tool module and the stalk of a target plant in the corresponding crop row; and to calculate longitudinal distance offsets between each tool module and the stalk of a target plant in the corresponding crop row (or to calculate a temporal offset between a tool module and the corresponding target plant based on a current velocity of the autonomous vehicle). Accordingly, the autonomous vehicle can drive each tool module to the lateral offset position of the next target plant in its corresponding crop row as the autonomous vehicle continues to navigate forward; and the autonomous vehicle can trigger each tool module to execute an agricultural action once the autonomous vehicle can traverse the corresponding longitudinal distance offset.

Therefore, the autonomous vehicle can detect target plants in "entry images" recorded by a set of front cameras arranged proximal the front of the autonomous vehicle, and the autonomous vehicle can then adjust lateral positions and selectively trigger tool modules to execute actions based on lateral and longitudinal positions of target plants detected in these entry images.

However, the autonomous vehicle can include any configuration of front cameras 112.

3.3.2 Feedback Cameras

The autonomous vehicle can also include a set of feedback cameras 136 arranged behind the light module, such as in the tool housing 120 or just ahead of the tool modules. For example, the autonomous vehicle can include one feedback camera coupled to each tool receptacle 124 in the tool housing 120, wherein each feedback camera faces downward to define a field of view that includes an end effector of a tool module loaded into its corresponding tool receptacle 124 (or that includes a reference feature connected to the end effector and extending above the soil when the end effector is submerged in soil, as described below). In another example, a feedback camera is integrated into, coupled to, or arranged over each tool module installed in the tool housing, wherein each feedback camera faces downward to define a field of view that includes the end effector of its corresponding tool module.

Each feedback camera 136 can thus record image data representing interactions between its corresponding tool module and plants passing under this tool module. In particular, a feedback camera 136 can record images (hereinafter "feedback images") of interactions between an end effector—of a corresponding tool module loaded into the tool housing 120—and plants passing under the autonomous vehicle. As described below, the autonomous vehicle can analyze a series of feedback images recorded by a feedback camera 136 to characterize interactions between the tool module and a series of target plants traversed by the tool module as the tool module executes an action on these target plants.

However, the autonomous vehicle can include any configuration of feedback cameras 136.

3.4 Weeding Module

In one implementation, a tool receptacle in the tool housing is loaded with a weeding module. In this implementation, the weeding module can include a pair of primary blades and a blade actuator configured to transition the primary blades between open and closed positions. In this implementation, the primary blades: can define curved, cantilevered sections extending from driveshafts suspended from the tool receptacle; and submerged in topsoil, such as configured to run 0-60 millimeters below grade while the autonomous machine traverses an agricultural field in order to dislodge weeds from topsoil. The primary blades can also be geared or otherwise driven together by the blade actuator—such as an electromagnetic rotary motor or a pneumatic linear actuator—such that the primary blades open and close together.

In the closed position, tips of primary blades can come into contact or nearly into contact such that the primary blades form a continuous barricade across the width of the weeding module. The primary blades in the closed position can thus displace topsoil and tear weeds out of the topsoil across the full lateral span of the primary blades in the closed position. In this implementation, the pair of primary blades can also be vertically offset relative to one another, thereby enabling the tips of the blades to overlap to ensure a continuous barricade across the width of the weeding module in the closed position.

However, when opened by the blade actuator, tips of the primary blades spread apart, thereby forming a "gap" between the tips of the primary blades. The blade actuator can therefore transition the primary blades to the open position in order to form a gap between the primary blades: sufficient to fully clear the stalk of a target plant passing under the weeding module; sufficient to minimally disrupt topsoil around the target plant; but sufficiently closed to dislodge other non-target plants (e.g., weeds) immediately adjacent the target plant from the topsoil as the autonomous machine autonomously navigates past the target plant.

In one implementation, the blade actuator is configured to retain the primary blades in the closed position by default such that the primary blades displace topsoil and tear weeds out of the topsoil across the full lateral span of the primary blades as the autonomous machine navigates along a crop row. However, in this example, upon nearing a target plant, the autonomous machine can trigger the blade actuator to open the primary blades by the nominal blade gap width to permit the target plant to pass through the weeding module substantially undisturbed. Once the target plant passes the weeding module, the autonomous machine can trigger the blade actuator to return to the closed position, thereby closing the "gap" just behind the stalk of the plant and disrupting weeds growing on the back side of the target plant.

4. Deployment and Setup

In one implementation, to deploy the autonomous vehicle to an agricultural field to execute an agricultural action, a user, field operator, or remote operator generates a work order for the autonomous vehicle through a work order interface, such as executing in a native application or web browser at a mobile or local computing device.

For example, to initialize a new work order, the work order interface can render a geospatial map of a geographic region and prompt the user (or field operator, remote operator) to: enter a set of (e.g., three or more) geospatial coordinates defining a boundary of an agricultural field; select a set of geospatial waypoints defining the boundary of the agricultural field on the geospatial map; or select a predefined area representing the agricultural field in the geospatial map. The work order interface (or a remote computer system) can thus define waypoints, vertices, and/or a boundary around the agricultural field accordingly. The work order interface can then prompt the user (or field operator, remote operator) to enter: a plant type (butter lettuce, Yukon potato, soybean) of the crop planted on the agricultural field; a plant maturity (e.g., an age or heading stage) of the crop; and an agricultural action (e.g., seeding, weeding, watering) for the agricultural field. The work order interface (or a remote computer system) can then compile these data and the location of the agricultural field into a work order and schedule delivery of the autonomous vehicle to this agricultural field to execute the agricultural action accordingly.

A field operator may then: deliver and unload the autonomous vehicle to the agricultural field or to a road (e.g., a service road) nearby; (re)fuel the autonomous vehicle; load a set of tool modules (e.g., weeding tools) for the agricultural action specified in the work order into the tool module(s) in the autonomous vehicle; adjust lateral spacing of the tool modules according to crop row space of the agricultural field; and then depart the agricultural field (e.g., to deliver a second autonomous vehicle to another agricultural field).

The autonomous vehicle (and/or the remote computer system) can then autonomously navigate toward a start point on the agricultural field and initialize nominal parameters for executing the agricultural action via these tool modules based on other data stored in the work order.

5. Initial Autonomous Operation

The autonomous vehicle can then autonomously navigate toward a start point (e.g., a first waypoint) in the agricultural field, such as at a nearest corner of the agricultural field. While approaching the start point at the agricultural field, the autonomous vehicle can detect a first set of crop rows in an image feed output by a forward-mounted, outwardly-facing optical sensor (e.g., a color camera, a LIDAR sensor) arranged on the autonomous vehicle and globally align its longitudinal axis of the autonomous vehicle to the crop rows. As the autonomous vehicle approaches an adjacent end of the first set of crops rows on the agricultural field, the autonomous vehicle can: detect a first column of target plants in these crop rows with the outwardly-facing optical sensor; and execute smaller lateral adjustments to refine its lateral alignment to these target plants. As the autonomous vehicle passes over this first column of target plants, the autonomous vehicle can: detect the first column of target plants in a sequence of entry images recorded by the front camera(s); and laterally align the tool modules with corresponding target plants in this first column of target plants.

As the autonomous vehicle enters the agricultural field, the autonomous vehicle can also: detect soil around these target plants in this sequence of entry images; extract characteristics of the soil (e.g., looseness, soil type, moisture content, soil consistency) from these entry images (e.g., based on movement of soil around a probe suspended from the light module into the soil; based on color and "roughness" of soil depicted in these entry images); and/or read soil characteristics (e.g., moisture content, temperature) from a sensor probe suspended from the autonomous vehicle into the soil.

6. Initial Tool Settings

Block S110 and S112 of the method S100 recite: based on a type of a crop planted on the agricultural field and a maturity of the crop, setting a nominal blade gap width of a weeding module installed in an autonomous agricultural vehicle; and setting the nominal blade speed for the weeding module, respectively. Generally, in Blocks S110 and S112, the autonomous vehicle can set nominal parameters for executing the specified agricultural action with the loaded tool modules based on limited data contained in the work order and/or limited data collected by the autonomous vehicle once deployed to the agricultural field. For example, the autonomous vehicle (or the remote computer system) can extract plant type and plant maturity (or plant age) from the work order; and the autonomous vehicle can measure or derive a looseness, soil type, moisture content, and/or soil consistency of the agricultural field upon initial entry onto the agricultural field.

6.1 Derived Factors

The autonomous vehicle can then derive secondary factors from these data. For example, the autonomous vehicle (or the remote computer system) can query a crop database or crop table with the plant type and plant maturity (or plant age) of the crop for: an estimate of the stalk width (or stalk diameter) of target plants in the agricultural field; and an estimate of the root depth (or root sensitivity, root robustness) of target plants in the agricultural field. In another example, the remote computer system can query a soil database or soil table with the looseness, soil type, moisture content, and/or soil consistency of the agricultural field for a probability that soil clumps large enough to disrupt or upset target plants are present near target plants in the agricultural field. In this example, wetter clumps of soil may be more likely to break into smaller soil clumps upon impact with the blade of a weeding module, but drier clumps of soil may be more likely to remain unbroken upon impact with a weeding module blade; accordingly, the remote computer system can estimate greater probability of problematic soil clumping with drier, rockier, and more compacted soil, and vice versa.

6.2 Tool Parameters: Blade Gap Width

The autonomous vehicle can then calculate tool parameters and autonomous vehicle settings based on these crop, soil, and/or secondary factors.

In one implementation, the autonomous vehicle calculates a nominal blade gap width for weeding modules (i.e., a target distance between tips of opposing blades in a weeding module when these blades are drawn past the stalk of a target plant in order to disturb or uproot weeds and other plants around the target plant without disturbing the target plant itself) based on the estimated stalk width of the type of crop at its current maturity. In one example, the autonomous vehicle (or the remote computer system) sets the nominal blade gap width at: 20 mm for lettuce at two weeks from seeding; 30 mm for lettuce at three weeks from seeding; 40 mm for lettuce at four weeks from seeding; and 50 mm for lettuce after five weeks from seeding and until harvest. In another, to avoid disrupting a small target plant with shallow roots but to improve weeding accuracy for more mature plants with deeper root structures, the autonomous vehicle (or the remote computer system) can set the nominal blade gap width at: 50 mm for lettuce at two weeks from seeding; 40 mm for lettuce at three weeks from seeding; 30 mm for lettuce at four weeks from seeding; and 20 mm for lettuce after five weeks from seeding and until harvest. In yet another example, because stalk width variance may increase with plant age, the autonomous vehicle (or the remote computer system) sets a nominal blade gap width equal to the estimated stalk width of the crop at its current maturity, plus an offset buffer proportional to crop age. In this example, the autonomous vehicle can set a nominal blade gap width of: 1 centimeter for a two-week-old lettuce, plus a 5% offset buffer; 2 centimeters for a six-week-old lettuce, plus a 10% offset buffer; and 3 centimeters for an eight-week-old lettuce, plus a 12% offset buffer.

The autonomous vehicle (or the remote computer system) can also calculate and a root sensitivity buffer (e.g., a minimum gap between tips of weeding module blades and the stalk and roots of a plant) and incorporate this root sensitivity buffer into the nominal blade gap width. For example, older plants may exhibit deeper, more stable root systems and may therefore be less susceptible to being uprooted by a weeding module; the autonomous vehicle can therefore adjust the root sensitivity buffer proportional inversely proportional to an age or maturity of the crop. Similarly, looser soil may provide less support to plant roots; the autonomous vehicle can therefore adjust the root sensitivity buffer proportional to soil looseness. In yet another example, large clumps of soil present in crop rows may be more likely to impact and disrupt target plants; the autonomous vehicle can therefore adjust the root sensitivity buffer proportional to size and frequency of soil clumps predicted in the field—as described above—based on soil type, consistency, and moisture content.

The autonomous vehicle (or the remote computer system) can then update the nominal blade gap width according to the root sensitivity buffer.

6.3 Tool Parameters: Blade Open Distance

The autonomous vehicle can similarly define a nominal blade open distance (i.e., a longitudinal distance—centered on the stalk of a target plant—that the blades in a weeding module are held fully open as these blades are drawn past a target plant) for a weeding module. For example, the autonomous vehicle (or the remote controller) can set the nominal blade open distance equal to the nominal blade gap width. In another example, the autonomous vehicle (or the remote computer system) sets the nominal blade open distance proportional to (e.g., 15% greater than) the blade gap width in order to accommodate for variance in blade actuation times as weeding module blades move through soil areas exhibiting soil consistency and moisture content variance.

6.4 Tool Parameters: Blade Pressure

Similarly, the autonomous vehicle (or the remote computer system) can set a nominal blade pressure (i.e., a downward pressure applied on blades of a weeding module, which may proportionally affect depth of these blades running through soil below-grade) for a weeding module. For example, because weeds may grow deeper roots over time, the autonomous vehicle (or the remote computer system) can set the nominal blade pressure proportional to a time since a last weeding operation on the agricultural field. In a similar example, because older crops may exhibit deeper root systems that are more resilient to upset by deeper blades, the autonomous vehicle can set the nominal blade pressure proportional to a maturity of the crop. Additionally or alternatively, because a weeding module may dig deeper into looser soil, the autonomous vehicle can set the nominal blade pressure inversely proportional to soil looseness.

In another variation in which the autonomous vehicle adjusts blade depth of a weeding module by directly raising and lowering the weeding module (e.g., by raising a lowering a tool mounted coupled to the weeding module) rather than by adjusting pressure on the weeding module, the autonomous vehicle can similarly set a nominal blade depth (i.e., a target distance of weeding module blades running below-grade): proportional to time since a last weeding operation at the agricultural field; proportional to maturity of the crop; and/or inversely proportional to looseness of the soil; etc.

6.4 Tool Parameters: Blade Operating Speed

The autonomous vehicle (or the remote computer system) can also set a nominal blade operating speed (e.g., an average or peak angular speed of weeding module blades when transitioned between open and closed positions) of a weeding module. For example, the autonomous vehicle can set a low nominal blade operating speed in order to limit displacement of soil—by these weeding module blades—onto adjacent target plants, which may otherwise block sunlight to weight down, retard growth, and/or eventually kill these target plants. In this example, the autonomous vehicle can also: set a lower nominal blade operating speed for an agricultural field with drier soil and with larger soil clumps, since these drier, larger soil clumps may be more prone to impact and damage target plants when hit by faster weeding module blades; and vice versa.

Furthermore, the autonomous vehicle can match a nominal ground speed for the autonomous vehicle as the autonomous vehicle traverses crop rows to the nominal blade operating speed. More specifically, if the autonomous vehicle opens weeding module blades slowly according to a relatively slow nominal blade operating speed but the autonomous vehicle is moving at relatively high ground speed, the autonomous vehicle may necessarily trigger the blades to open at a relatively large distance from the base of a target plant in order to ensure that the blades reach the nominal blade gap width upon reaching a target plant, but this may prevent the blades from disrupting weeds near the base of the target plant. However, by slowing the ground speed of the autonomous vehicle to compensate for the slow initial blade operating speed, the autonomous vehicle can trigger the blades to open at a relatively short distance from the base of the target plant, thereby enabling the blades to disrupt weeds nearer the base of the target plant. Then, during operation, the autonomous vehicle can incrementally increase its ground speed and the blade operating speed as the autonomous vehicle confirms that actuation of the blades at the nominal blade operating speed casts no or minimal soil onto target plants—and vice versa—as described below.

7. Agricultural Action

Blocks S120, S122, and S124 of the method S100 recite: detecting a first target plant passing under the autonomous agricultural vehicle and aligned with the weeding module; in response to the first target plant approaching the weeding module, triggering the weeding module to open a set of weeding blades to the nominal blade gap width at a nominal blade speed; and, in response to the first target plant passing the weeding module, triggering the weeding module to close the set of weeding blades, respectively. Generally, in Blocks S120, S122, and S124, while approaching the first column of target plants in the first crop rows in the agricultural field, the autonomous vehicle can execute processes described in U.S. patent application Ser. No. 16/267,362: to detect a first target plant in an entry image recorded by a front camera; to laterally align a weeding module to this target plant; to selectively trigger the weeding module to open its blades—at the nominal blade operating speed—to the nominal blade gap width as the blades approach the first target plant; and to selectively trigger the weeding module to close its blades—at the nominal blade operating speed—as the blades pass the first target plant in order to weed around the first target plant while rendering the first target plant substantially undisturbed.

8. Automatic Tool Setting Adjustment

The autonomous vehicle can then: track movement of the first target plant and movement of soil around the first target plant in a sequence of feedback images recorded by a feedback camera as the corresponding weeding module moves past the first target plant; implement closed-loop control to update the blade gap width, the blade open distance, the blade pressure, the blade operating speed, and/or the ground speed of the autonomous vehicle, etc. in order to maintain or increase precision of weeding operations by the first weeding module; and then implement these revised parameters during a next weeding action by the first weeding module as the autonomous vehicle draws the first weeding module around a next target plant.

8.1 Blade Gap Width

In one implementation, to refine blade gap width for a first weeding module, the autonomous vehicle: drives the first weeding module toward and past the first target plant; selectively actuates the first weeding module to weed around the target plant during a first weeding action, as described above; detects a first target plant in a sequence of feedback images recorded by a first feedback camera during this first weeding action; and tracks and characterizes motion of target plant across this sequence of feedback images. For example, the autonomous vehicle can extract an absolute change in the centroid location of the first target plant from the beginning to the end of the first weeding action. In another example, the autonomous vehicle characterizes motion of the centroid of the first target plant over the course of the first weeding action by: calculating a centroid of the first target plant in each feedback image in the sequence of images; integrating absolute changes in centroid location of the first target plant over this sequence of images; and store this integral as a representation of motion of the first target plant. In a similar example, the autonomous vehicle: detects motion of leaves of the first target plant over the sequence of feedback images; and stores a sum or integral of this leaf motion as motion of the first target plant during this first weeding action. Then, in this implementation, if motion of the first target plant exceeds a preset threshold (e.g., for a type and maturity of the crop), the autonomous vehicle can: predict that the first target plant was upset by the first weeding action; and then increase the blade gap width for the first weeding module (e.g., by 5%) accordingly. Conversely, if motion of the first target plant is less than the preset threshold (or a different low-motion threshold), the autonomous vehicle can: predict that the tips of the blades of the first weeding module were significantly clear of the first target plant; determine that the first target plant was not upset by the first weeding action; and then decrease the blade gap width for the first weeding module (e.g., by 5%) accordingly.

In a similar implementation, in preparation for the first weeding module executing a second weeding action on a next target plant, the autonomous vehicle can adjust the blade gap width as a function of (e.g., linearly with) motion of the first target plant during the first weeding action— including increasing gap width for high motion of the first target plant and decreasing gap width for instances of no motion of the first target plant—within a threshold deviation from the nominal blade gap width.

In another implementation, the autonomous vehicle can scan the sequence of feedback images for secondary plants (i.e., weeds) around the first target plant. If the autonomous vehicle detects a secondary plant near the first target plant and determines that motion of the first target plant is less than a low-motion threshold, the autonomous vehicle can: confirm that the first target plant was not upset, but that a weed was by the first weeding module during the first weeding action; and decrease blade gap width accordingly. Conversely, if the autonomous vehicle detects no secondary plant near the first target plant and determines that motion of the first target plant is more than the low-motion threshold and greater than a high-motion threshold, the autonomous vehicle can: confirm that the first target plant was not upset and that all weeds were cleared around the first target plant during the first weeding action; and maintain the current blade gap width accordingly. Similarly, if the autonomous vehicle detects motion of the first target plant in excess of the high-motion threshold, the autonomous vehicle can: confirm that the first target plant was upset during the first weeding action; and increase current blade gap width accordingly.

The autonomous vehicle can implement similar methods and techniques to adjust the blade open distance for the first weeding module during its next weeding action.

8.2 Blade Pressure

In another implementation, to refine blade pressure (or blade depth) for the first weeding module, the autonomous vehicle can isolate a soil region in the sequence of feedback images described above and implement methods and techniques similar to those described above to characterize motion in the soil region in this sequence of feedback images. Then, if motion of this soil region is less than a threshold soil motion (e.g., set proportional to blade operating speed) and if the blades of the first weeding module are not visible in feedback these images (i.e., these blades remain fully submerged in soil during the weeding action), the autonomous vehicle can reduce blade pressure for the first weeding module in order to raise the blades nearer to grade (or decrease blade depth directly) and thus enable these blades to better reach weeds with shallower root structures. Conversely, if the autonomous vehicle detects soil motion in excess of the threshold soil motion and/or if the autonomous vehicle detects the blades rising out of the soil during this first weeding action, the autonomous vehicle can increase blade pressure for the first weeding module in order to set the blades further below grade (or increase blade depth directly) and thus better ensure that these blades remain submerged in soil during the next weeding action.

8.3 Blade Operating Speed

In another implementation, the autonomous vehicle can refine blade operating speed based on amounts of soil cast onto the first target plant during the first weeding action. For example, for each feedback image in the sequence of feedback images, the autonomous vehicle can: detect pixels depicting the first target plant; generate a count of "green" pixels depicting the first target plant; generate a count of "brown" pixels depicting soil around the first target plant; and calculate a ratio of green pixels to brown pixels. The autonomous vehicle can then: filter green-to-brown pixel ratios around this sequence of feedback images in order to reject noise; calculate an absolute change in ratios of green pixels to brown pixels over the sequence of feedback images, which represents an amount of soil cast onto the first target plant during the first weeding action; and then adjust the blade operating speed of the first weeding module inversely proportional to this absolute change in ratios of green pixels to brown pixels (i.e., inversely proportional to an amount of soil cast onto the first target plant). For example, if the absolute change in the ratio of green pixels to brown pixels is high—which indicates that a large amount of soil was cast onto the first target plant during the first weeding action—the autonomous vehicle can reduce the blade operating speed of the first weeding module in order to reduce velocity of soil moved by the blades and thus reduce an amount of soil cast onto the next target plant during a next weeding action. Conversely, if this absolute change in the ratio of green pixels to brown pixels is low—which indicates that very little soil was cast onto the first target plant—the autonomous vehicle can increase the blade operating speed in order to enable the blades to fully open and close nearer the stalk of the plant for a given ground speed of the autonomous vehicle and thus enable the first weeding module to remove weeds closer to the next target plant.

In the foregoing implementation, the autonomous vehicle can also adjust its ground speed as a function of the blade operation speed. For example, the autonomous vehicle can decrease its ground speed response to decreasing the blade operation speed in order to enable these blades to fully open and close near the base of the next target plant despite the slower operating speed of the blades. Conversely, the autonomous vehicle can increase its ground speed response to increasing the blade operation speed in order to complete the current job processing the agricultural field in less time.

In one variation in which the weeding module is pneumatically controlled, the autonomous vehicle adjusts the blade operating speed of the first weeding module by adjusting a regulated pressure of a pneumatic subsystem in the autonomous vehicle (or in the weeding module more specifically) inversely proportional to the amount of soil cast onto the target plant during the weeding cycle. For example, if the absolute change in ratio of green pixels to brown pixels is high—which indicates that a large amount of soil was cast onto the target plant—the autonomous vehicle can decrease the regulated pressure of the pneumatic subsystem; and vice versa.

8.4 Other Weeding Modules and Next Target Plants

The autonomous vehicle can concurrently execute the foregoing process to refine weeding module parameters for each weeding module loaded into the autonomous vehicle as these weeding modules traverse first target plants in their corresponding crops rows in the agricultural field.

The autonomous vehicle can then: continue to navigate forward along the first set of crop rows; detect a next target plant in each of these crop rows; selectively actuate each weeding module according to its corresponding weeding module parameters; again refine these weeding module parameters according to features detected in feedback images recorded by feedback cameras in the autonomous vehicle as these weeding modules interface with these next target plants; and repeat this process for each subsequent column of target plants in this set of crop rows. The autonomous vehicle can repeat this process for each subsequence set of crop rows until the autonomous vehicle has completed processing of the agricultural field.

9. Error Handling

In Block S160, the autonomous vehicle prompts verification by a remote human operator: in response to the revised blade gap width deviating from the nominal blade gap width by more than a threshold gap difference; and/or in response to the revised blade speed deviating from the nominal blade speed by more than a threshold speed difference. Generally, in Block S160, the autonomous vehicle can selectively request remote control or remote verification by a remote human operator response to operational or weeding-related errors occurring at the autonomous vehicle.

9.1 Remote Operator Trigger: Parameter Deviation

In one implementation, the autonomous vehicle (or the remote computer system) sets upper and lower bounds for refinement of weeding module parameters and then requests remote control or remote verification by a remote human operator when the parameters move outside of these bounds (e.g., reach a bound of an adjustable range).

In one example, the autonomous vehicle defines a tolerance (e.g., +/−10%) for refinement of the blade gap width from the nominal blade gap width. During operation, the autonomous vehicle implements closed-loop controls to adjust the blade gap width—within this tolerance range—based on data extracted from feedback images recorded by the feedback camera, as described above. As the blade gap width approaches or exceeds an upper or lower bound of this tolerance range, the autonomous vehicle: broadcasts a request to a remote operator portal for verification of operation of the weeding module; streams a video from the corresponding feedback camera (and/or from other cameras on the autonomous vehicle) and the current blade gap width to the remote operator portal; and continues to navigate along the agricultural field and execute weeding actions. The remote operator portal—viewed by a remote human operator—can then enable controls for spontaneously: stopping operation of the autonomous vehicle and dispatching the field operator to repair the autonomous vehicle; resetting the autonomous vehicle generally or resetting the corresponding weeding module; confirming the current blade gap width for the weeding module; adjusting the tolerance range for the blade gap width for the autonomous vehicle during this operation at the autonomous vehicle; and/or adjusting the blade gap width of one or all weeding modules in the autonomous vehicle. The remote operator may then control or interface with the autonomous vehicle accordingly via the remote operator portal.

The autonomous vehicle can implement similar methods and techniques: to set a tolerance (e.g., +/−8%) for adjustment of blade open distance from the nominal blade open distance for weeding modules; and to selectively request assistance from a remote operator if the blade open distance approaches or exceeds an upper or lower bound of this tolerance range.

Additionally or alternatively, the autonomous vehicle can implement similar methods and techniques: to set a tolerance (e.g., +/−5%) for adjustment of blade pressure from the nominal blade pressure for weeding modules; and to selectively request assistance from a remote operator if the blade pressure approaches or exceeds an upper or lower bound of this tolerance range.

In another example, the autonomous vehicle implements similar methods and techniques: to set a tolerance (e.g., +20%/−5%) for adjustment of ground speed of the autonomous vehicle from the nominal ground speed; and to selectively request assistance from a remote operator if the ground speed of the autonomous vehicle pressure approaches or exceeds an upper or lower bound of this ground speed.

In a similar example, if the autonomous vehicle determines that recent weeding actions by weeding modules in the autonomous vehicle have yielded a high frequency of target plants with more than a threshold proportion of green areas covered in soil following completion of these weeding actions—such as estimated by the autonomous vehicle based on changes in ratios of green pixels to brown pixels in images recorded by the corresponding feedback camera—the autonomous vehicle can reduce the blade speed (and reduce ground speed of the autonomous vehicle accordingly) down to a minimum blade speed and prompt the human operator to verify and/or correct operation of these weeding modules.

9.2 Remote Operator Trigger: Terminal Actions

In another implementation, the autonomous vehicle selectively requests assistance from a remote human operator in response to detecting disruption of a high frequency of target plants in the agricultural field.

In one example, the autonomous vehicle: tracks change in locations of the centroids of target plants—relative to ground features—before and after weeding actions based on features extracted from feedback images recorded during these weeding actions; interprets a weeding action on a target plant as terminal if the absolute location of the centroid of the target plant changed by more than a threshold distance (e.g., ten centimeters); and counts a frequency of terminal weeding actions (or a ratio of terminal to correct weeding actions) at the agricultural field. Then, if the frequency of terminal weeding actions exceeds a threshold frequency (e.g., two target plants in the last 100 target plant processed) or if the ratio of terminal to correct weeding actions exceeds a threshold frequency (e.g., 2%) for the agricultural field, the autonomous vehicle can automatically: halt operation; and broadcast a request to a remote operator portal for assistance. The autonomous vehicle can also broadcast recent weeding actions completed by the autonomous vehicle to the remote operator portal, such as: each terminal weeding action completed by the autonomous vehicle on the current field; and/or most-recent weeding actions completed by each weeding module in the autonomous vehicle (e.g., the previous 20 weeding actions by each weeding module). The remote operator portal can then enable controls for: resuming operation of the autonomous vehicle; dispatching the field operator to repair the autonomous vehicle; resetting the autonomous vehicle generally; resetting individual weeding modules; and/or adjusting specific settings or parameters at the weeding modules.

9.3 Field Operator Return Trigger

In another implementation, in response to detecting a mechanical failure, the autonomous vehicle (or the remote computer system, the remote human operator) can dispatch the field operator to return to the agricultural field to repair or maintain the autonomous vehicle.

In one example, the autonomous vehicle detects failure of blades in a particular weeding module to reliably and repeatably open and close when triggered. If adjusting blade operation speed, blade depth, etc. fails to correct this problem and the autonomous vehicle detects an increased frequency of terminal weeding actions by the particular weeding module, (e.g., due to the particular weeding module failing to open its blades fully before passing target plants in its crop row), the autonomous vehicle can prompt field operations to return to the field to repair the particular weeding module. The autonomous vehicle can then: retract this particular weeding module out of the soil or transition and maintain blades in this particular weeding module in the open position; and continue operating autonomously in the agricultural field. In particular, the autonomous vehicle can: selectively operate the other weeding modules in the autonomous vehicle in order to weed around target plants in corresponding crop rows while the particular weeding module is held open or retracted from this corresponding crop row.

For example, if the autonomous vehicle is loaded with four weeding modules and the autonomous vehicle determines that the second weeding module has failed while traversing crop rows [1, 2, 3, 4], the autonomous vehicle can: retract the second weeding module; continue to operate the first, third, and fourth weeding modules while traversing crop rows [1, 2, 3, 4] in order to weed crop rows [1, 3, 4]. Upon reaching the end of crop rows [1, 2, 3, 4], the autonomous vehicle can: execute a U-turn; align itself with crop rows [2, 3, 4, 5]; and operate the first and fourth weeding modules while traversing crop rows [1, 2, 3, 4] in order to weed crop rows [2, 5]. Upon reaching the end of crop rows [2, 3, 4, 5], the autonomous vehicle can: execute a U-turn, align itself with crop rows [6, 7, 8, 9]; and operate the first, third, and fourth weeding modules while traversing crop rows [6, 7, 8, 9] in order to weed crop rows [6, 8, 9]. Upon reaching the end of crop rows [6, 7, 8, 9], the autonomous vehicle can: execute a U-turn, align itself with crop rows [7, 8, 9, 10]; and operate the first and fourth weeding modules while traversing crop rows [7, 8, 9, 10] in order to weed crop rows [7, 10]. The autonomous vehicle can repeat this process until the autonomous vehicle completes the weeding operation at the agricultural field or until the field operator returns to the autonomous vehicle to repair the second weeding module.

10. Other Actions

The autonomous vehicle can implement similar methods and techniques to: detect quantity, location, and/or distribution of water or pesticides applied to target plants by tool modules in the autonomous vehicle during execution of agricultural actions on an agricultural field based on features extracted from corresponding feedback cameras in the autonomous vehicle; and to adjust timing, duration, pressure, direction, and/or other operating parameters of these tool modules accordingly.

The autonomous vehicle can additionally or alternatively implement these methods and techniques to: detect quantity, location, and/or distribution of seeds or seedlings planted in crop rows in an agricultural field by tool module during execution of seeding actions on an agricultural field based on features extracted from corresponding feedback cameras in the autonomous vehicle; and to adjust timing, duration, depth, and/or other operating parameters of these tool modules accordingly.

In these variations, the autonomous vehicle can also implement methods and techniques described above to selectively request operational verification or remote control by a remote human operator responsive to operational failures and/or deviation from nominal tool module parameters during these agricultural operations.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for executing agricultural actions on an agricultural field comprising:
   determining a nominal blade separation distance for a weeding module of an autonomous agricultural system;
   at the autonomous agricultural system, while traversing the agricultural field:
      detecting a first target plant aligned with the weeding module;
      autonomously controlling a first weeding action based on a location of the first target plant, comprising:
         in response to the first target plant approaching the weeding module, autonomously triggering the weeding module to open a set of weeding blades to the nominal blade separation distance; and
         in response to the first target plant passing the weeding module, triggering the weeding module to close the set of weeding blades; and
      based on sensor feedback, characterizing a motion for the first weeding action;
   detecting disruption of the first target plant;
   responsive to detecting disruption of the first target plant, selectively requesting remote assistance at a remote computing system;
   providing feedback to the remote computing system comprising: the motion for the first weeding action and at least one image of the first target plant;
   responsive to the feedback, adjusting the nominal blade separation distance for the weeding module; and
   at the autonomous agriculture system, controlling a second weeding action based on the adjusted nominal blade separation distance.

2. The method of claim 1, wherein the sensor feedback comprises a sequence of images captured during the first weeding action, wherein the motion comprises a centroid motion of the first target across the sequence of images.

3. The method of claim 2, further comprising: determining terminal weeding associated with the first target plant based on satisfaction of a motion threshold.

4. The method of claim 3, wherein providing feedback to the remote computing system occurs responsive to the determination of terminal weeding associated with the first target plant.

5. The method of claim 1, wherein providing feedback to the remote computing system further comprises: streaming video along with a current blade separation distance.

6. The method of claim 1, further comprising, prior to the second weeding action: resetting the weeding module from the remote computing system.

7. The method of claim 1, wherein adjusting the nominal blade separation distance comprises:
   at the autonomous agriculture vehicle, automatically calculating the adjusted nominal blade separation distance based on the sensor feedback; and
   prompting verification by a remote human operator via the remote computing system.

8. The method of claim 7, wherein prompting verification occurs responsive to satisfaction of a threshold deviation a nominal parameter value.

9. The method of claim 1, wherein the feedback comprises: the location of the first target plant, a plant type of the first target plant, a plant size of the first target plant, and a set of weeding metrics.

10. The method of claim 9, wherein the set of weeding metrics comprises a terminal ratio.

11. The method of claim 9, wherein the set of weeding metrics comprises a count of weeding actions.

12. A method comprising:
   at an autonomous agriculture system which is traversing in an agricultural field:
      detecting a first target plant aligned with an actuator;
      autonomously controlling the actuator based on a location of the first target plant and a set of control parameters; and
      based on sensor feedback, characterizing a motion of the actuator;
   detecting disruption of the first target plant;
   responsive to detecting disruption of the first target plant, providing, to a remote computing system comprising, feedback with a request for remote assistance, the feedback comprising: the motion and at least one image of the first target plant;
   responsive to the feedback, adjusting the set of control parameters for the actuator; and
   at the autonomous agriculture system, controlling the actuator based on the adjusted set of control parameters.

13. The method of claim 12, wherein the sensor feedback comprises a sequence of images captured during the autonomously controlled actuation of the actuator, wherein the motion comprises a centroid motion of the first target across the sequence of images.

14. The method of claim 13, further comprising: determining termination of the first target plant based on satisfaction of a motion threshold.

15. The method of claim 14, wherein the feedback provision to the remote computing system occurs responsive to termination of the first target plant.

16. The method of claim 12, wherein the feedback comprises: the location of the first target plant, a plant type of the first plant, a plant size of the first plant, and a set of actuation metrics.

17. The method of claim 12, wherein adjusting the set of control parameters comprises:
   at the autonomous agriculture vehicle, automatically calculating an actuation distance based on the sensor feedback; and
   prompting verification by a remote human operator via the remote computing system.

18. A method for executing agricultural actions on an agricultural field comprising:
   determining a nominal blade separation distance for a weeding module of an autonomous agricultural system;
   at the autonomous agricultural system, while traversing the agricultural field:
      detecting a first target plant aligned with the weeding module;
      autonomously controlling a first weeding action based on a location of the first target plant, comprising:
         in response to the first target plant approaching the weeding module, autonomously triggering the weeding module to open a set of weeding blades to the nominal blade separation distance; and
         in response to the first target plant passing the weeding module, triggering the weeding module to close the set of weeding blades; and
      based on sensor feedback, characterizing a motion for the first weeding action;
   providing feedback to the remote computing system comprising: the motion for the first weeding action, at least one image of the first target plant, the location of the first target plant, a plant type of the first target plant, a plant size of the first target plant, and a set of weeding metrics comprising a terminal ratio;
   responsive to the feedback, adjusting the nominal blade separation distance for the weeding module; and
   at the autonomous agriculture system, controlling a second weeding action based on the adjusted nominal blade separation distance.

* * * * *